US012695704B2

(12) United States Patent
Cherian et al.

(10) Patent No.: US 12,695,704 B2
(45) Date of Patent: Jul. 28, 2026

(54) SELECTING PERIODS OF TIME FOR PAYLOAD TRANSMISSION BASED ON DETECTED ATTRIBUTES

(71) Applicant: Ordr Inc., Santa Clara, CA (US)

(72) Inventors: Deepak Cherian, Newark, CA (US); Vijayaraghavan Doraiswami, Santa Clara, CA (US); Senthil Arunachalam, Fremont, CA (US)

(73) Assignee: Ordr Inc., Santa Clara, CA (US)

( * ) Notice: Subject to any disclaimer, the term of this patent is extended or adjusted under 35 U.S.C. 154(b) by 0 days.

(21) Appl. No.: 18/581,926

(22) Filed: Feb. 20, 2024

(65) Prior Publication Data

US 2025/0267101 A1     Aug. 21, 2025

(51) Int. Cl.
H04L 47/24 (2022.01)
H04L 41/5022 (2022.01)

(52) U.S. Cl.
CPC .......... H04L 47/24 (2013.01); H04L 41/5022 (2013.01)

(58) Field of Classification Search
None
See application file for complete search history.

(56) References Cited

U.S. PATENT DOCUMENTS 7,742,406 B1 * 6/2010 Muppala ................. H04L 47/10
                                                                              370/392
9,460,220 B1   10/2016 Jenkins et al.

| | | |
|---|---|---|
| 10,270,886 B1 | 4/2019 | Postelnik et al. |
| 10,554,738 B1 * | 2/2020 | Ren ..................... G06F 11/3442 |
| 10,742,687 B2 | 8/2020 | Pandian et al. |
| 11,645,180 B1 * | 5/2023 | Jain ..................... G06F 11/3006 |
| | | 702/186 |
| 11,704,351 B1 * | 7/2023 | Soleimani ............. G06F 40/284 |
| | | 704/9 |
| 12,405,785 B1 | 9/2025 | Pathak et al. |
| 2006/0174155 A1 | 8/2006 | Mansell |
| 2010/0251231 A1 | 9/2010 | Coussemaeker et al. |
| 2011/0029921 A1 | 2/2011 | Terada et al. |
| 2013/0235795 A1 * | 9/2013 | Huang ................... H04L 67/56 |
| | | 370/328 |
| 2014/0286160 A1 * | 9/2014 | Zhang ................. H04L 47/2433 |
| | | 370/230 |

(Continued)

FOREIGN PATENT DOCUMENTS

| | | |
|---|---|---|
| CN | 111796853 A | 10/2020 |
| CN | 120110693 A | 6/2025 |

(Continued)

*Primary Examiner* — Phyllis A Book
(74) *Attorney, Agent, or Firm* — Invoke

(57) ABSTRACT

Techniques for determining whether a device communicating in a network should transmit a payload, e.g., priority dataset, to a server based on the device type, analysis of the current attributes of the device, and the location of the device are disclosed. When the current attributes of the device, in combination with the device location, are determined to meet criticality criteria, instructions are provided to the device to refrain from transmitting the payload. When the current attributes of the device, in combination with the device location, are determined to not meet criticality criteria, instructions are provided to the device to permit transmission of the payload by the device.

19 Claims, 5 Drawing Sheets

(56)  References Cited

U.S. PATENT DOCUMENTS

| | | | |
|---|---|---|---|
| 2014/0331042 A1* | 11/2014 | Salo | H04L 47/805 |
| | | | 713/160 |
| 2017/0346758 A1 | 11/2017 | Dimitropoulos | |
| 2018/0032900 A1* | 2/2018 | Chowdhury | G06N 20/10 |
| 2018/0032901 A1* | 2/2018 | Chowdhury | G06F 40/169 |
| 2018/0083833 A1* | 3/2018 | Zoll | G06F 18/214 |
| 2018/0144815 A1* | 5/2018 | Chapman-McQuiston | |
| | | | G16H 40/20 |
| 2018/0241644 A1 | 8/2018 | Lu | |
| 2019/0235850 A1 | 8/2019 | Mukherjee et al. | |
| 2019/0306067 A1* | 10/2019 | Suraparaju | H04L 69/161 |
| 2019/0317952 A1* | 10/2019 | Li | G06F 16/2246 |
| 2020/0264867 A1 | 8/2020 | Edwards et al. | |
| 2020/0410001 A1* | 12/2020 | Sarkissian | G06F 3/0482 |
| 2021/0042180 A1* | 2/2021 | Sutton | H02J 7/0042 |
| 2021/0119870 A1* | 4/2021 | Hu | H04L 45/124 |
| 2021/0158171 A1* | 5/2021 | Rausch | H04L 67/1097 |
| 2021/0218678 A1* | 7/2021 | Azami | H04L 47/28 |
| 2023/0042458 A1* | 2/2023 | Makhija | G06Q 10/06 |
| 2023/0353590 A1* | 11/2023 | Hubbard | H04L 63/1408 |
| 2024/0053718 A1 | 2/2024 | Jasper et al. | |
| 2025/0123813 A1* | 4/2025 | Singh | G06F 8/33 |
| 2026/0067406 A1 | 3/2026 | Rozen et al. | |

FOREIGN PATENT DOCUMENTS

| | | | | |
|---|---|---|---|---|
| EP | 2411925 B1 | 11/2016 | | |
| WO | WO-2018087721 A1 * | 5/2018 | | H04L 1/00 |

* cited by examiner

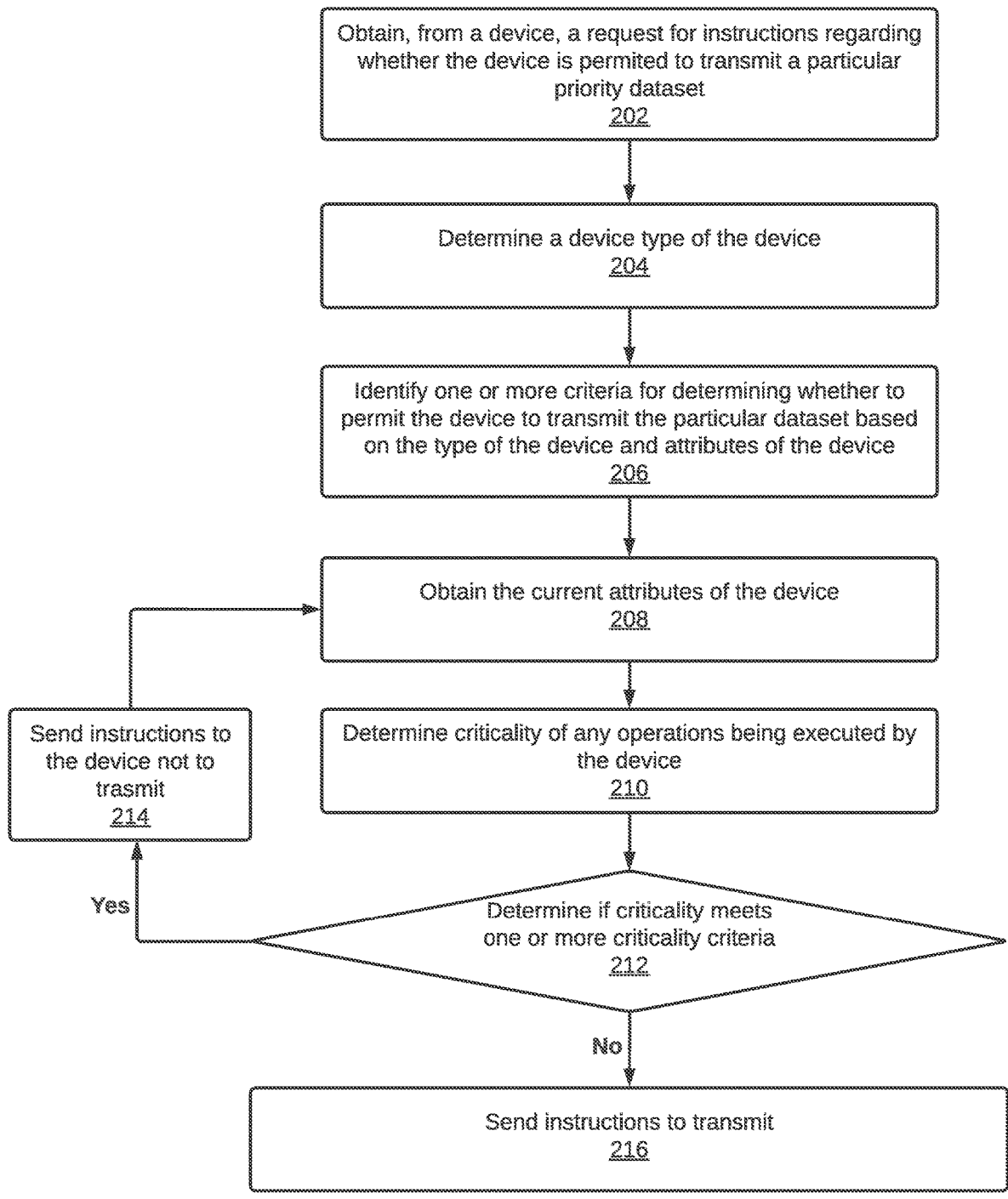

Obtain, from a device, a request for instructions regarding whether the device is permitted to transmit a particular priority dataset
202

Determine a device type of the device
204

Identify one or more criteria for determining whether to permit the device to transmit the particular dataset based on the type of the device and attributes of the device
206

Obtain the current attributes of the device
208

Send instructions to the device not to trasmit
214

Determine criticality of any operations being executed by the device
210

Determine if criticality meets one or more criticality criteria
212

Yes

No

Send instructions to transmit
216

FIG. 2A

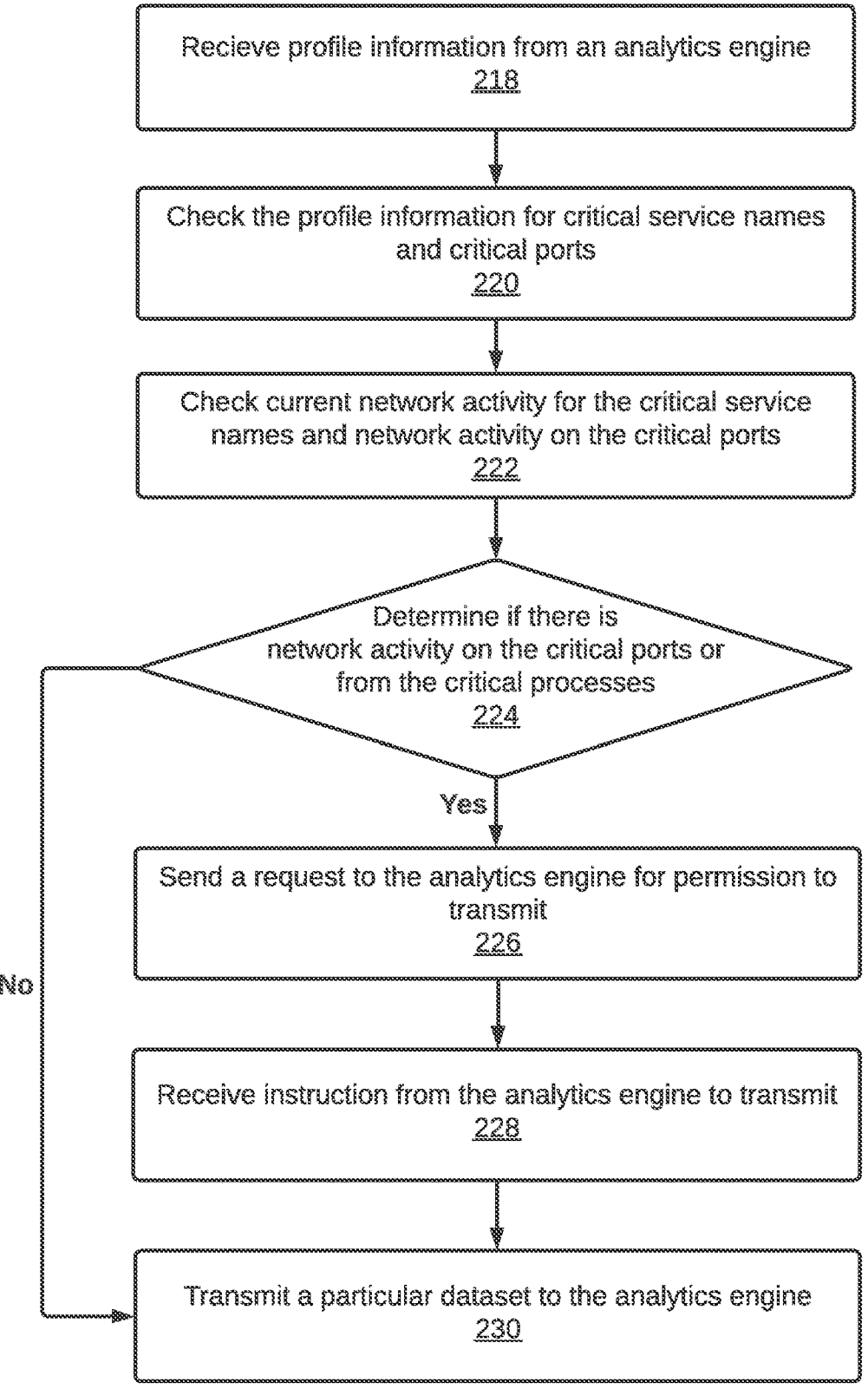

Recieve profile information from an analytics engine
218

Check the profile information for critical service names and critical ports
220

Check current network activity for the critical service names and network activity on the critical ports
222

Determine if there is network activity on the critical ports or from the critical processes
224

Yes

No

Send a request to the analytics engine for permission to transmit
226

Receive instruction from the analytics engine to transmit
228

Transmit a particular dataset to the analytics engine
230

FIG. 2B

SELECTING PERIODS OF TIME FOR PAYLOAD TRANSMISSION BASED ON DETECTED ATTRIBUTES

TECHNICAL FIELD

The present disclosure relates to devices in a network. In particular, the present disclosure relates to determining an appropriate time to transmit information from the device based on current attributes of the device.

BACKGROUND

The term "Internet of Things" (IoT) refers to a network of a wide variety of devices, such as computers, sensors, vehicles, home appliances, medical equipment, and/or surveillance equipment. Such devices may be referred to as "IoT devices." Many IoT devices may be easily relocated from one physical location to another physical location, for example, from one subnet to another subnet, without explicit permission or acknowledgement from a network administrator. In many instances, the location of the device is relevant to the criticality of the operations being performed by the device.

Various tools are available to help organizations collect and manage information related to the devices on their network. Such tools perform critical functions of gathering all the system attributes, software bill of materials, installed patches, and any custom attributes that the organization needs for maintaining the devices. As many of the devices in the network may be performing critical functions at unscheduled times during a particular period, determining when to transmit payloads from the devices to a management tool may vary greatly from device to device and between devices of the same type.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 2A and 2B illustrate an example set of operations for determining when to transmit payloads from devices in a network in accordance with one or more embodiments;

DETAILED DESCRIPTION

Figure 1:
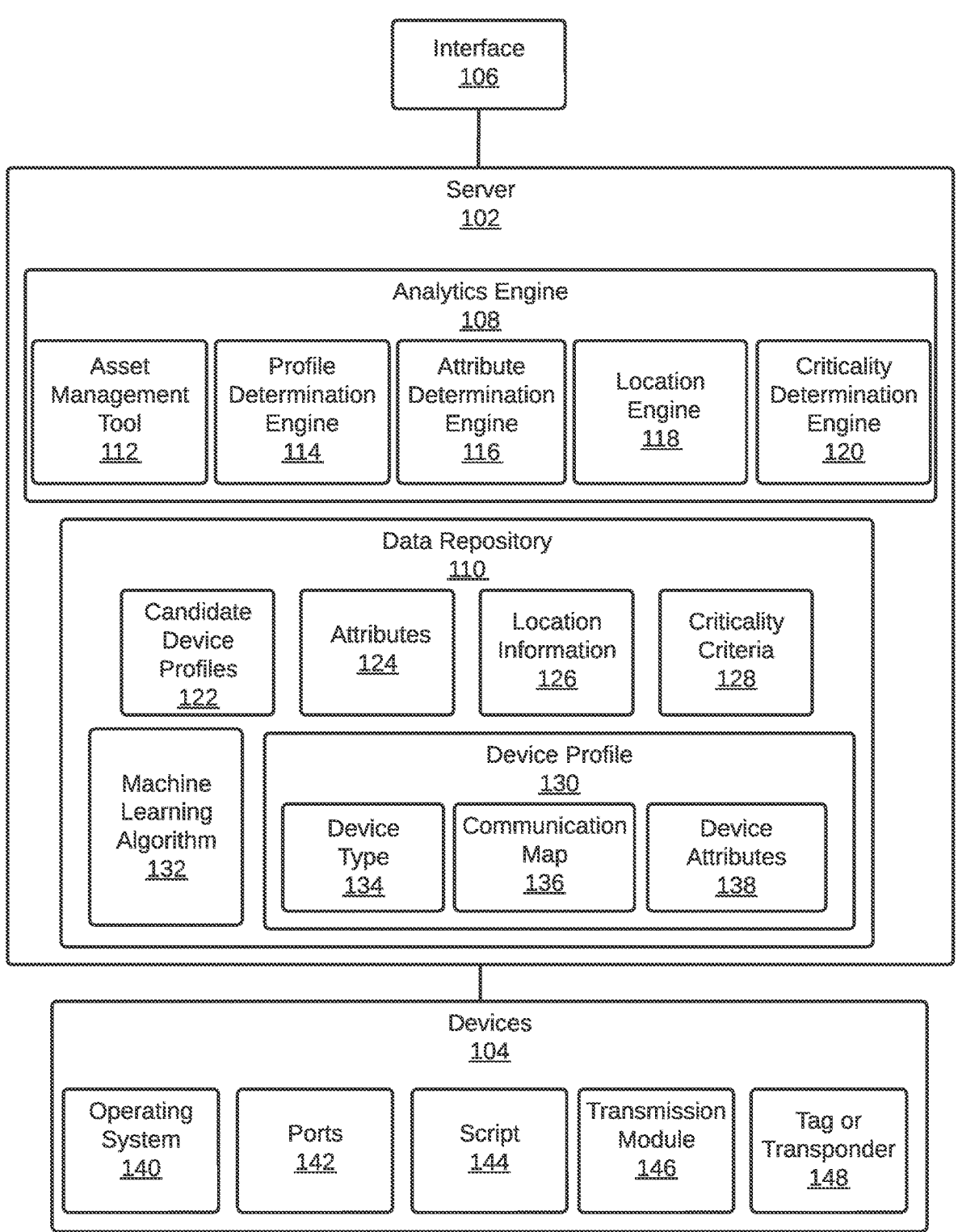
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. ASSET MANAGEMENT SYSTEM ARCHITECTURE
3. DETERMINING SAFE PERIODS TO TRANSMIT PAYLOADS
4. CRITICALITY BASED ON LOCATION
5. COMPUTER NETWORKS AND CLOUD NETWORKS
6. MICROSERVICE APPLICATIONS
7. HARDWARE OVERVIEW
8. MISCELLANEOUS; EXTENSIONS

1. General Overview

One or more embodiments determine whether a device communicating in a network should transmit a payload to a server based on the device type, analysis of the current attributes of the device, and/or the location of the device. The system analyzes the current attributes and type of the device, in combination with the device location, to determine whether a criticality criteria is met. A criticality criteria being met is indicative of active, critical usage of the device that should not be interrupted or affected by operations that may be postponed to a later time when criticality criteria is not met. When the current attributes and type of the device, in combination with the device location, are determined to meet criticality criteria, the system provides instructions to the device to refrain from transmitting the payload. When the current attributes of the device, in combination with the device location, are determined to not meet criticality criteria, the system provides instructions to the device to permit transmission of the payload by the device.

In one or more embodiments, the criticality criteria for denying payload transmission includes detecting (a) data being transmitted by or to the device on a device port of the device that is deemed to be critical, (b) a current location of the device identified as being critical, (c) data transmitted to or from the device that meets criticality criteria, and/or (d) use of a transmission protocol corresponding to data transmitted to or from the device mapped to a criticality category that meets criticality criteria. Criticality criteria may be determined based on a device type corresponding to the device.

One or more embodiments use a machine learning model trained to predict device types. Each training dataset used to train the machine learning model to predict device types includes a particular set of device attributes and a corresponding device type.

One or more embodiments use a machine learning model trained to predict criticality levels for operations being performed by the device. Each training dataset used to train the machine learning model to predict criticality levels includes a particular set of current attributes and a corresponding criticality level. Determining that a device is currently performing an operation that meets criticality criteria includes applying the machine learning model to a set of current attributes to determine a criticality level of the operation being executed and comparing the criticality level to criticality criteria.

One or more embodiments described in this Specification and/or recited in the claims may not be included in this General Overview section.

2. Asset Management System Architecture

FIG. 1 illustrates a system 100 in accordance with one or more embodiments. As illustrated in FIG. 1, the system 100 includes a network comprising a server 102, devices or end systems 104 connected to the server 102, and an interface 106 for allowing a user to communicate with the server 102. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the server 102 is hardware and/or software that provides services and resources to the devices 104 in a network. The devices 104 may be industrial equipment in a manufacturing setting or within a geographical area, or medical equipment in a hospital or clinical environment. The devices 104 in the network may be constantly changing. New devices may be added to the network. Devices removed from the network for maintenance or repair may be returned to the network. Devices in the network may be moved from one location to another within the network. Devices in the network may be used for different purposes and may operate in different modes. The server 102 includes an analytics engine 108 and a data repository 110 for managing the devices 104 in the network, including collecting information related to the devices 104, e.g., payloads.

In one or more embodiments, the analytics engine 108 refers to hardware and/or software configured to perform operations described herein for determining when to transmit a payload to a server. Examples of operations for determining when to transmit the payload are described below with reference to FIGS. 2A and 2B.

In an embodiment, the analytic engine 108 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the analytics engine 108 includes an asset management tool 112, a profile determination engine 114, an attribute determination engine 116, a location engine 118, and a criticality determination engine 120. These components work together to collect and manage information related to the devices 104 in the network. More particularly, the analytics engine 108 may receive a request from a device for instruction to transmit a payload. The analytics engine 108 identifies the type of the device making the request. The analytics engine 108 then determines what operations the device is performing and where the device is located. From this information, the analytics engine 108 then determines if the conditions are appropriate for the device to transmit the payload. If the conditions are met for transmitting the payload from the device 104, the analytic engine 108 provides instructions to the device to transmit the payload. Although the components of analytics engine 108 will be described as separate components, multiple components may be combined into one, and operations described as being performed by one component may alternatively, or in addition, be performed by another component.

In one or more embodiment, the asset management tool 112 of the analytics engine 108, also referred to as an asset tracking or inventory management tool, is software and/or hardware designed to efficiently monitor, track, and manage an organization's physical assets. These assets can range from IT equipment (like computers and servers) to medical devices, vehicles, and machinery. The asset management tool 112 may include features including, asset identification, location tracking, status and condition monitoring, depreciation tracking, lifecycle management, alerts and notifications, reporting and analytics, integration capabilities, and/or security and compliance.

In one or more embodiments, the asset management tool 112 allows for the unique identification of each asset through methods like barcodes, QR codes, RFID tags, or serial numbers, and it enables users to track where each asset is located, both in real-time and historically. The asset management tool 112 may be used to record and display the status, condition, and maintenance history of each asset and may assist in managing the financial aspects of assets by tracking their depreciation over time. In examples, asset management tools 112 allow for tracking assets from procurement to disposal, including procurement details, maintenance records, and retirement information, and provides alerts for maintenance schedules, warranty expirations, or any other predefined events. The asset management tool 112 may generate reports and provides analytics on asset utilization, maintenance costs, and other relevant metrics.

In one or more embodiments, the asset management tool 112 integrates with other software systems like Enterprise Resource Planning (ERP) or Computerized Maintenance Management System (CMMS) for seamless operation. The asset management tool 112 may ensure that assets are managed in compliance with relevant industry standards and security protocols.

In one or more embodiments, the asset management tool 112 includes Open Source Asset Tracking System (OSATS), Asset Panda, Snipe-IT, IT Glue, or Freshservice. OSATS and Snipe-IT are open-source software tools useful for tracking the location and usage of assets including medical supplies, equipment, and pharmaceuticals as well as generating reports on inventory levels, usage, and costs. Asset Panda, IT Glue, and Freshservice are cloud-based asset tracking systems useful for tracking a wide range of assets, including medical supplies, and generating reports on inventory levels, usage, and costs.

In one or more embodiments, the asset management tool 112 includes Ordr Software Inventory Collector (OSIC), a software tool used to collect and manage inventory data in an information technology environment, including for example, a hospital environment. OSIC is an application used to track a wide range of inventory items, including medical devices and IT equipment. OSIC may be used to automate many of the tasks involved in inventory management, such as generating reports and managing orders.

Knowing the type of device is important to understanding when the device is performing critical operations. A network may have devices of varying types. A device type may relate to the function of the device, the model of the device, the make of the device, the manufacturer of the device, the operating system being run by the device, updates installed on the device, and other characteristics. Any of these characteristics may affect the criticality of the operations being performed by the device. In addition, the devices on a network may be continuously changing as new devices are added to the network, and devices that were removed from the network, e.g., for repair or updating, are returned to the network.

In one or more embodiments, when the device type of the device operating in the network is not already known, the profile determination engine 114 provides the analytics engine with this information. The profile determination engine 114 refers to software and/or hardware configured to determine a device profile or type from a set of candidate device profiles 122, for the devices 104 in a network. In one or more embodiments, the profile determination engine 114 utilizes one or more classifiers for determining a device profile for a device. Each classifier takes as input one or more attribute values for attributes 124 associated with a particular device. Different attribute values are input to different classifiers; however, attribute values input to different classifiers may overlap with each other. Based on the inputted attribute values, each classifier outputs a respective candidate device profile, from a set of candidate device profiles 122, for a device.

In one or more embodiments, each classifier corresponds to an attribute type. Each classifier takes as input attribute values for attributes 124 of the corresponding attribute type. A classifier does not take as input any attribute values associated with attribute types other than the corresponding attribute type. As an example, a first classifier may correspond to flow attributes. The first classifier may take as input, for example, an Internet Header Length value, a DSCP value, a Total Length value, and a Flags value. Meanwhile, a second classifier may correspond to DICOM attributes. The second classifier may take as input, for example, a Creation Time value, a Manufacturer value, and an Image Size value.

In other embodiments, the first and second classifiers are randomly associated with the attributes. The first classifier may take as input an attribute value associated with a first attribute type and an attribute value associated with a second attribute type. The second classifier may take as input an attribute value associated with the second attribute type and an attribute value associated with a third attribute type.

In one or more embodiments, the first and second classifiers may be generated based on machine learning and/or other algorithms. A classifier may be expressed in the form of a decision tree. Based on various input parameters, the decision tree may be traversed. A final node of the decision tree may output a candidate device profile for a device. In other embodiments, other forms of classifiers may be used.

In an embodiment, each classifier is associated with a weight. The first classifier may be associated with a first weight and the second classifier may be associated with a second weight. The weight associated with a particular classifier represents a significance of a candidate device profile output from the particular classifier for a device, as compared to candidate device profiles output from other classifiers. In particular, each candidate device profile output from a respective classifier, for a device, is weighted by the weight associated with the respective classifier. The candidate device profiles, together with the associated weights, are used to determine a current device profile for a device. The weight associated with a particular classifier may depend on the attributes associated with the particular classifier. As an example, the use of Digital Imaging and Communications in Medicine (DICOM) attribute values may determine a device profile for a device more accurately than the use of flow attribute values. Hence, a classifier that takes as input DICOM attribute values may be associated with a greater weight than a classifier that takes as input flow attribute values.

In one or more embodiments, a candidate device profile indicates (a) a device photo for a device, (b) expected attribute values associated with a device, and/or (c) a device category. A device photo associated with a candidate device profile may be obtained based on user input. Additionally, or alternatively, a device photo associated with a candidate device profile may be obtained by a system. The expected attribute values of a candidate device profile may be determined via supervised machine learning and/or unsupervised machine learning. A candidate device profile may indicate multiple expected values, or a range of expected values, for an attribute. A candidate device profile 122 may indicate a single expected value for an attribute. A candidate device profile 122 may indicate that an expected value for an attribute is null.

As an example, a particular medical device profile may indicate the following:

(a) Flow attributes: bytes communicated in a communication session are within the range 10 KB to 50 KB; frequency of communication sessions is within once every 30 minutes to once every 60 minutes; and duration of communication sessions is within the range of 0.5 seconds to 1.5 seconds;

(b) DNS attributes: query type of a DNS query communicated during a communication session is limited to requests for IPV4 address records (that is, there should be no request IPv6 address records);

(c) DICOM attributes: size of image communicated during a communication session is within the range of 0 MB and 100 MB;

(d) POCT attributes: null (that is, the POCT attribute values should be unavailable); and (e) Traffic statistics: setup time for a Transmission Control Protocol (TCP) session is under a threshold of 1 second; a number of retransmissions of a particular data packet is under a threshold of 5 times.

For a detailed description of operations for determining a device profile, please refer to commonly owned U.S. Pat. No. 10,742,687, the content of which is incorporated herein by reference in its entirety.

Devices on the network may be constantly performing operations, and/or the operations may be performed at unscheduled or random times throughout a day. This prevents or makes impractical routine or scheduled payload transmission from the devices 104, for there is no consistent time that the device will be idle. However, not all operations performed by the device 104 may be considered critical. In embodiments, the analytics engine 108 utilizes the current attributes to determine the criticality of the operations being performed by the devices 104. The attribute determination engine 116 refers to software and/or hardware configured to determine values for a set of attributes 124 of communication sessions conducted by the devices 104. A value for an attribute 124 may also be referred to herein as an "attribute value."

In one or more embodiments, types of attributes include but are not limited to flow attributes, dynamic host configuration protocol attributes (DHCP), Digital Imaging and Communications in Medicine attributes (DICOM), Point of Care Testing (POCT) attributes, Common Industrial Protocol (CIP) attributes, Session Initiation Protocol (SIP) attributes, RTSP attributes: attributes associated with a Real Time Streaming Protocol (RTSP) used by a communication session, Building Automation and Control network (BACnet) attributes.

Attributes associated with a flow of a communication session may include any of the following: a source address (such as an IP address and/or a Media Access Control (MAC) address); a destination address; a source port; a destination port; a number of transmitted bytes; a number of received bytes; a source subnet; or a destination subnet.

Attributes associated with a particular protocol (such as, IPv4, IPv6, DNS, DICOM, POCT, CIP, SIP, RTSP, DHCP, and BACnet) include values for standard fields specified and/or defined by a corresponding protocol specification. The standard fields may be included in a header, tail, and/or other portion of a data packet.

As an example, standard fields in an IPV4 data packet include any of: Internet Protocol Version; Internet Header Length; Differentiated Services Code Point (DSCP); Explicit Congestion Notification (ECN); Total Length; Identification (for example, for identifying the group of fragments of a single IP datagram); Flags; Fragment Offset; Time to Live (TTL); Protocol (for example, for defining the protocol used in the data portion of the IP datagram); Header Checksum; Source Address; Destination Address; and Options. Additional and/or alternative standard fields may be used. A value for a standard field in an IPV4 data packet may be a value for an attribute 124 of a communication session.

As another example, standard fields in a DNS query or response include any of: Identification; Flags; Number of Questions; Number of Answers; Number of Authority Resource Records (RRs); Number of Additional RRs; Request Type. Additional and/or alternative standard fields may be used. A value for a standard field in a DNS query or response may be a value for an attribute 124 of a communication session.

As another example, standard fields in a DHCP packet include any of: MAC address; IP address; subnet; host name; DHCP Options; DHCP Class Identifier; Manufacturer; DHCP Parameter List; and DHCP Vendor Class. Additional and/or alternative standard fields may be used. A value for a standard field in a DHCP data packet may be a value for an attribute 124 of a communication session.

As another example, DICOM is a protocol for the communication and management of medical imaging information and related data. Standard fields in a DICOM data packet include any of; Creation Time; Manufacturer; Institution Name; Referring Physician's Name; Consulting Physician's Name; Operator's Name; Warning Reason; Failure Reason; Patient's Name; Patient Identifier; Patient's Birth Date; Patient's Sex; Image Size. Additional and/or alternative standard fields may be used. A value for a standard field in a DICOM data packet may be a value for an attribute 124 of a communication session.

In one or more embodiments, the location engine 118 is software and/or hardware used to automatically identify and track the location of devices. The location engine 118 may be a component of a Real-Time Location System (RTLS) or a Location Determination Engine (LDE). The RTLS is a comprehensive system designed to track and manage the real-time location of objects in a specific area, e.g., hospital, while the LDE determines a geographical location of a device in a broader context, e.g., GPS coordinates. Using various technologies and methods, both RTLS and LDE provide accurate and up-to-date location information to the analytics engine 108.

In one or more embodiments, the RTLS uses a tag or transponder 148 that is attached to each device 104 in the network to emit a unique identifier and location information. The tags 148 may use various technologies like RFID (Radio-Frequency Identification), GPS (Global Positioning System), Wi-Fi, Ultra-Wideband (UWB), Bluetooth, or other wireless communication protocols.

In one or more embodiments, the facility in which the devices operate includes readers or receivers, e.g., fixed or mobile devices, that receive signals from the tags. The readers are equipped with sensors and antennas specific to the chosen technology (e.g., RFID readers, GPS receivers, Wi-Fi access points). Depending on the technology used, there might be additional infrastructure elements like anchor nodes (for UWB or similar technologies) or GPS satellites (for GPS-based RTLS).

In one or more embodiments, the location of the tag 148 is computed using any number of methods including, for example, triangulation or trilateration, signal strength and angle of arrival, and RFID-based methods. Triangulation or trilateration is used with technologies like Ultra-Wideband (UWB) or Global Positioning Systems (GPS) and involves using the time it takes for a signal to travel from the tag to multiple receivers to calculate the tag's location. By comparing the signal arrival times, the system can determine the tag's position in relation to the receivers. Signal strength and angle of arrival are applied to technologies like Wi-Fi or Bluetooth, and they use the strength of the signal received by multiple access points or receivers to estimate the tag's distance and direction. RFID readers emit radio signals to energize passive RFID tags. When a tag 148 is energized, it sends back its unique ID, allowing the reader to identify the location of the tag 148. The location engine 118 may use location information stored in the data repository 110 to assist in identifying the devices 104 and their location.

The received data, including the tag's unique identifier and location information, is processed by the location engine 118, which may use an algorithm to analyze the data and calculate the precise location of the tagged devices. The location data of the device may be presented, for visualization by a user, on the interface 106. The location data may be displayed as part of a software dashboard or application. Users can view the real-time location information, historical tracking data, and perform various analyses based on the collected data.

When the analytics engine 108 includes a location determination engine (LDE), the LDE collects signals from various sources that assist in determining the location of the device. These sources may include systems like GPS (Global Positioning System), GLONASS (Russian system), Galileo (European system), and BeiDou (Chinese system) provide precise location information using signals from satellites. Mobile devices communicate with cell towers to establish and maintain connections. This data can be used for coarse location information. Wi-Fi access points broadcast their unique identifiers (MAC addresses). By mapping these identifiers to known locations, an LDE can estimate the position of a device based on nearby Wi-Fi signals. Like Wi-Fi, Bluetooth signals can be used for proximity-based location determination.

In embodiments, once the signals are received by the LDE, the LDE processes the data to extract relevant information, which may include signal strength, time delay, and other parameters. Triangulation involves using multiple fixed points (like satellites or cell towers) to determine the location of a device. By measuring the angles from each point to the device, the LDE can calculate its position. Trilateration involves measuring the distances from multiple fixed points to the device. With this information, the LDE can determine the intersection point, which represents the location of the device. In environments with known locations (e.g., buildings, malls), the LDE can create a "fingerprint" of the signal strengths from different access points. When a device enters this environment, the LDE compares the observed signal strengths to its database to estimate the device's position.

In one or more embodiments, the LDE employs machine learning algorithms to improve location accuracy. The machine learning algorithms learn from past location data and adjust their calculations based on patterns and trends. The LDE may use Geographic Information Systems (GIS) data to refine location information. This can include maps, terrain information, and other geographical data. The LDE provides the location information to the analytics engine 108 in the form of coordinates (latitude, longitude), an address, or other location-based information.

In one or more embodiments, the criticality determination engine 120 of the analytics engine 108 is software and/or hardware used to identify whether the operations being performed by the device 104 are critical. The criticality determination engine 120 uses the information provided to the analytics engine 108 by the components of the analytics engine 108, i.e., the type of device, the current attributes of the device, and the location of the device to determine whether the current operations being performed by the device allow for transmission of a payload, e.g., priority dataset, to the server 102. When criticality determination engine 120 determines, using any or all of the determined current attributes of the device or the current location of the device, that the device is performing a critical operation or function, the analytics engine 108 may provide instruction to the device 104 to refrain from transmitting a payload. Alternatively, the analytics engine 108 may refrain from providing instruction to the device 104, which prevents the device 104 from transmitting the payload.

In one or more embodiments, the criticality determination engine 120 analyzes the attributes of the device 104 to determine if critical operations are being performed by the device 104. More particularly, once the type of the device 104 is provided to the criticality determination engine 120, either manually or by the profile determination engine 114, the criticality determination engine 120 may determine that the device 104, (a) is transmitting or receiving data on a port 142 of the device 104 that is deemed to be critical, (b) is in a current location that is identified as being critical, (c) is transmitting or receiving data that meets criticality criteria, (d) is utilizing a transmission protocol corresponding to data transmitted to or from the device that is mapped to a criticality category that meets the criticality criteria, or (e) any combination of these characteristics.

In one or more embodiments, a data repository 110 is any type of storage unit and/or device (e.g., a file system, database, collection of tables, or any other storage mechanism) for storing data. Further, a data repository 110 may include multiple different storage units and/or devices. The multiple different storage units and/or devices may or may not be of the same type or located at the same physical site. Further, a data repository 110 may be implemented or executed on the same computing system as the analytics engine 108. Additionally, or alternatively, a data repository 110 may be implemented or executed on a computing system separate from the analytics engine 108. The data repository 110 may be communicatively coupled to the analytics engine 108 via a direct connection or via a network.

Information used by the analytics engine 108 to determine a safe period for payload transmission may be implemented across any of the components within the system 100. However, this information is illustrated within the data repository 110 for purposes of clarity and explanation.

In one or more embodiments, the candidate device profiles 122 in the data repository 110 are profiles of various device types that are available on the network or that may become available on a network. The candidate device profiles 122 may be updated as new devices are added to the network, as updates are made to the devices on the network, and/or as changes are made to the network. The candidate device profile 122 may include identification of a device category. The candidate device profile 122 may include a device photo for a device. The candidate device profile 122 may include expected attribute values associated with a device of the type identified.

In one or more embodiments, the attributes 124 in the data repository 110 include candidate attributes, i.e., attributes that may be utilized or expressed by the devices 104 in the network, and current attributes, i.e., attributes that are actively being executed by the devices 104. Attributes 124 may also be received from other, non-network sources, including, for example, data from ServiceNow, Tenable, Jamf, Intune, and other data sources to which the analytics engine 108 is integrated. Attributes 124 may include the following:

(a) Flow attributes: attributes associated with a flow of a communication session, including attributes associated with an Internet Protocol (such as, Internet Protocol version 4 (IPv4), Internet Protocol version 6 (IPv6)) used by a communication session;

(b) DNS attributes: attributes associated with a Domain Name System (DNS) protocol used by a communication session;

(c) DHCP attributes: attributes associated with a Dynamic Host Configuration Protocol (DHCP) used by a communication session;

(d) DICOM attributes: attributes associated with a Digital Imaging and Communications in Medicine (DICOM) protocol used by a communication session;

(e) POCT attributes: attributes associated with a Point of Care Testing (POCT) protocol used by a communication session;

(f) CIP attributes: attributes associated with a Common Industrial Protocol (CIP) used by a communication session;

(g) SIP attributes: attributes associated with a Session Initiation Protocol (SIP) used by a communication session;

(h) RTSP attributes: attributes associated with a Real Time Streaming Protocol (RTSP) used by a communication session; and/or (i) BACnet attributes: attributes associated with a Building Automation and Control network (BACnet) protocol used by a communication session.

In one or more embodiments, the location information 126 in the data repository 110 includes information required by the location engine 118 to determine the location of the devices 104 in the network. The location information 126 may include building plans, location of receivers and other sensors within the building, areas designated at critical, e.g., operating room, and areas determined to be non-critical, e.g., hallway. The location information may include maps identifying points of interest, locations of receivers and other sensors within a geographic area, and GPS coordinates. The location information 126 is dependent on the location engine 118 and the information required by the location engine 118 to determine the location of the devices 104.

In one or more embodiments, the criticality criteria 128 in the data repository 110 include reference tables or charts that identify ports 142 used by the devices 104 to transmit critical data, attributes, including transmission protocol and data transmitted, that are determined to be critical, potential locations of the devices 104 that are designated as being critical, and/or combinations of these characteristics deemed to be critical. The criticality criteria 128 may be provided in the form of a training set for a machine learning model. The training set may include a particular attribute and/or a particular location for a device of a particular type and the corresponding criticality level for the particular attribute and/or the particular location for the device of the particular type.

In one or more embodiments, criticality criteria 128 is different for devices of different types. The criticality criteria 128 may also be different for devices of the same or similar types. The level of criticality may also differ depending on other current attributes of the device. A device of a particular type determined to be using a transmission protocol mapped to a critical category may not be operating within a critical location; therefore, the criticality level may be less than if the critical transmission protocol was being used in a location designated as critical. For example, operation of an x-ray machine located in an operating room transmitting using DICOM may include a criticality level that is higher than operations of the same x-ray machine in a patient room transmitting using DICOM.

In one or more embodiments, the level of criticality required for a device to meet the criticality criteria may be lower for devices deemed to be performing highly critical operations, e.g., a heart assist device, whereas the level of criticality for a device deemed to be performing non-critical operations, e.g., a laptop, may be higher. The levels of criticality may be modified based on, for example, preferences of the organization, the sensitivity and/or criticality of the operations being performed, and/or time constraints on transmitting the payload.

In one or more embodiments, critical transmission protocols for medical devices ensure secure and reliable communication between devices, systems, and networks within a healthcare environment. These protocols are essential for maintaining patient safety, protecting sensitive data, and facilitating interoperability between various medical equipment. Critical transmission protocols for medical devices may include the following:

(a) DICOM (Digital Imaging and Communications in Medicine)—a standard for transmitting, storing, and sharing medical images, such as X-rays, MRIs, and CT scans. It ensures interoperability between different imaging devices and picture archiving and communication systems (PACS).

(b) IEEE 11073 (X73)—defines a set of protocols for communication between medical devices and healthcare information systems. It focuses on exchanging data related to patient vital signs and measurements.

(c) NTP (Network Time Protocol)—used to synchronize the time of medical devices and networked systems within a healthcare environment. Accurate time synchronization is crucial for coordinating events and timestamps in patient records.

(d) SNMP (Simple Network Management Protocol)—used for network management and monitoring of devices, including medical equipment. It allows for remote monitoring, configuration, and management of devices on a network.

(e) TCP/IP (Transmission Control Protocol/Internet Protocol)—the foundational suite of protocols used for communication over the internet and local networks, essential for enabling connectivity between medical devices, servers, and information systems.

(f) HTTP/HTTPS (Hypertext Transfer Protocol/Secure Hypertext Transfer Protocol)—are used for communication between web-based applications and devices. HTTPS adds a layer of encryption to secure data transmission.

(g) FTP/SFTP (File Transfer Protocol/Secure File Transfer Protocol)—allow for the secure transfer of files between devices and servers. SFTP adds encryption to protect data during transmission.

(h) Bluetooth and BLE (Bluetooth Low Energy)—wireless communication protocols used for short-range connections between medical devices, such as wearables, sensors, and smartphones.

(i) Zigbee and Z-Wave—are often used in healthcare IoT applications for connecting sensors, monitoring devices, and other healthcare-related equipment.

(k) MQTT (Message Queuing Telemetry Transport)—is a lightweight messaging protocol suitable for IoT applications, used for efficient and reliable communication between devices and servers in healthcare settings.

In one or more embodiments, critical locations for devices are locations or environments where interruption of operation of the device may result in damage, serious injury, or death. The damage may be to the device itself or to the surrounding area. Serious injury or death may result to an operator of the device or an individual benefiting from the device. For example, in a hospital environment, critical locations may include an operating room, an emergency room, or an intensive care unit (ICU). Non-critical locations in a hospital environment may include a hallway, a closet, or a storage room. The level of critically may be different for each of the critical and non-critical locations. An ICU may have a higher criticality level than a patient room. Similarly, a hallway may have a higher criticality level than a storage room.

In one or more embodiments, a machine learning algorithm 132 is an algorithm that can be iterated to learn a target model f that best maps a set of input variables to an output variable. In particular, a machine learning algorithm 132 is configured to generate and/or train a machine learning model The profile determination engine 114 may use machine learning models to determine the device profile 130. The attribute determination engine 116 may use machine learning models to determine the attributes of the device 104. The location engine 118 may use machine learning models to determine a location of the device 104. The criticality determination engine 120 may use machine learning models to determine if the current attributes of the device 104 meet criticality criteria.

A machine learning algorithm is an algorithm that can be iterated to learn a target model f that best maps a set of input variables to an output variable using a set of training data. The training data includes datasets and associated labels. The datasets are associated with input variables for the target model f. The associated labels are associated with the output variable of the target model f. For example, a training dataset used to train the machine learning model used by the profile determination engine 114 to predict device types may include a particular set of device attributes and a corresponding device type. A training dataset used to train the machine learning model used by the criticality determination engine 120 to predict criticality levels may include a particular set of current attributes and a corresponding criticality level. The training data may be updated based on, for example, feedback on the accuracy of the current target model f. Updated training data is fed back into the machine learning algorithm, which in turn updates the target model f.

A machine learning algorithm 132 generates a target model f such that the target model f best fits the datasets of training data to the labels of the training data. Additionally, or alternatively, a machine learning algorithm 132 generates a target model f such that when the target model f is applied to the datasets of the training data, a maximum number of results determined by the target model f matches the labels of the training data. Different target models can be generated based on different machine learning algorithms and/or different sets of training data.

A machine learning algorithm 132 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, the data repository 110 includes a device profile 130 for each of the devices 104 in the network. The device profile 130 may include a device type 134, a communication map 136, and device attributes for the device. The device profile 130 is generated by the analytics engine 108 and is installed as part of the script 144 on the device 104. The following are examples of compressed device profile information that may be provided to the device 104 by the analytics engine 108.

| Device Type | Critical Services | Critical Service Name | Communication ports |
|---|---|---|---|
| Percunav Ultrasound | DICOM | PercuNav | 53, 443, 137, 138, 445, 104 |
| Hologic Mammography | DICOM | Hologic, DigitalPersona | 53, 80, 135, 443, 445, 104 |

In one or more embodiments, the device type 134 in the device profile 130 identifies the characteristics of the particular device. This may include the operations that the device performs, the make of the device, the model of the device, the operating system installed on the device, and/or any software and/or hardware updates to the device. The device type 134 may also include usage information regarding the device.

In one or more embodiments, the communication map 136 in the device profile 130 is a diagram that illustrates the flow of information and interactions involving the particular device. The communication map 136 may provide a visual representation of how the device communicates with other components, systems, and stakeholder within an organization or environment. The communication map 136 may include information about the make, model, functionality, and interfaces of the device 104, both physical and digital. The communication map 136 may also contain information about how data flows to and from the device, protocols used for communication by the device, user interfaces of the device, as well as maintenance of and updates to the device. The communication map 136 may also include information regarding regulatory compliance, including, for example, certifications such as FDA approvals, CE markings, hardware maintenance, and calibration.

In one or more embodiments, the device attributes 138 in the device profile 130 identify attributes known to be used by the particular device or attributes that are available for use by the device.

In one or more embodiments, the devices 104 of the system 100 perform critical functions. The critical functions may be performed at various times throughout a day, and the times each day that the critical functions are performed may vary. Instructions for receiving a payload are typically not made while the device 104 is performing critical functions because of the possibility that the payload transmission may interfere with the performance of the critical function.

In a hospital, critical services are those that directly impact patient care, safety, and well-being. The devices 104 providing critical services are essential for the diagnosis, treatment, and monitoring of patients. Medical devices that provide critical services in a hospital environment may include ventilators, cardiac monitors, infusion pumps, defibrillators, pulse oximeters, anesthesia machines, radiology equipment (X-ray, CT, MRI), and ultrasound machines.

In an industrial setting, various devices perform critical functions that are essential for the safe, efficient, and reliable operation of industrial processes. These devices are designed to monitor, control, and execute tasks necessary for production, safety, and quality assurance. Devices that perform critical functions in an industrial setting may include sensors and transducers, actuators and valves, and/or safety interlock and emergency stop devices. These devices work collectively to ensure the smooth and safe operation of industrial processes. They are integrated into complex control systems that regulate various parameters, monitor performance, and respond to changes in the environment to maintain efficiency and productivity.

In one or more embodiments, the devices 104 include an operating system 140, ports 142, a script 144, a transmission module 146, and a tag or transponder 148.

In one or more embodiments, the operating system 140 of the device 104 is software that serves as an intermediary between computer hardware and the user's applications. The operating system 140 provides a platform for software applications to run on a computer or device by managing resources like memory, processing power, and input/output operations. The operating system 140 used by the device 104 depends on the specific requirements of the device 104 and the environment in which the device 104 operates. Examples of operating systems 140 include Real-Time Operating System (RTOS), Linux, Windows, VxWorks, QNX, MacOS, iOS, and Android Things.

In one or more embodiments, the device 104 includes one or more ports 142, which may be physical and/or digital ports. Physical ports are tangible, hardware-based interfaces on the device that allow for the connection of external devices or components. These ports are typically located on the outer surface of a device and are used to physically plug in cables, connectors, or other hardware. The physical ports facilitate the exchange of data, power, or other signals between the device and external peripherals. Examples of physical ports include USB ports (Universal Serial Bus), HDMI ports (High-Definition Multimedia Interface), Ethernet ports (for wired network connections), Audio jacks (for headphones, microphones, speakers), and Power ports (for electrical power input). Digital ports refer to software-based interfaces or entry points in an operating system or software environment of the device 104. Digital ports offer virtual access points that allow software components to communicate with each other or with external devices. Examples of digital ports include TCP/IP ports and GPIO (General Purpose Input/Output) pins. TCP/IP are specific numbers assigned to applications or services to facilitate communication over a network. TCP/IP ports are used in protocols like Transmission Control Protocol (TCP) and User Datagram Protocol (UDP). GPIO pins serve as digital ports that can be configured to input or output signals to control or receive data from external hardware.

In one or more embodiments, the devices 104 include a script 144 for facilitating communication with asset management tool 112 of the analytics engine 108. More particularly, the script 144 includes a set of instructions or commands that work in combination with the asset management tool 112 to automate the transmission of a payload, e.g., priority dataset, from the device to the server 102.

In one or more embodiments, the script 144 of the device 104 performs initial checks to determine whether to transmit a payload. The script 144 may determine if the device 104 is plugged in or operating in a battery mode. If the device 104 is determined to be operating in battery mode, the script 144 checks to confirm that the battery level is above a predetermined percentage, for example, 80%. When the battery level is less than the predetermined percentage, the payload may not be transmitted. When the battery level falls below the predetermined percentage during transmission of the payload, the transmission of the payload may be stopped.

In one or more embodiments, the script 144 receives from the analytics engine 108 the compressed profile information. The script 144 uses this information to identify critical service names and critical ports. When the script 144 determines that there is no network activity on the critical ports or from the critical processes, the device 104 may transmit the payload.

In one or more embodiments, when the script 144 determines from the compressed profile information that there is network activity on the critical ports or from the critical processes, the script 144 may seek from the analytics engine 108 permission to transmit the payload. Upon receiving instructions to transmit from the analytics engine 108, the device 104 may transmit the payload. Because the device 104 does not know its type or the criticality of the operations it is performing, the device 104 relies on the analytics engine 108 to determine when it is safe to transmit the payload.

In one or more embodiments, an OSIC script is installed on the devices 104 in the network to enable communication between the devices 104 and an OSIC asset management tool. The OSIC script is lightweight and achieves its purpose using only the components already installed in the operating system 140 of the devices 104 in the network. This may be important as there may be restrictions, e.g., FDA restriction on medical devices, on the installation of any new software components on a device or an end system.

In one or more embodiments, the device 104 includes a transmission module 146 for transmitting a payload from the device 104 to the asset management tool 112 of the server 102. The transmission module 146 may be configured to transmit the payload when the script 144 indicates that it is safe to transmit. As detailed above, indication from the script 144 may be provided to the transmission module 146 when it is determined that there is no process currently running for well-known critical service names and there is no network activity on the critical ports. Alternatively, indication to transmit may be provided upon receipt of instruction from the analytics engine 108 that the operations being performed by the device 104 have been determined by the criticality determination engine 120 to not meet a criticality threshold.

In one or more embodiments, the transmission module 146 is configurable as to when to transmit a payload. The payload from the device 104 may be scheduled to be transferred daily, every other day, one or more times a week, after any updates, upon any significant activity by the device, and/or based on any other criteria. The time of day of the transmission may also be configurable. In some instances, transmission may be configured to occur after midnight.

In one or more embodiments, the device 104 includes a tag or transponder 148. The tag or transponder 148 that is associated with each device 104 in the network may emit a unique identifier and location information. The tags 148 may use various technologies like RFID (Radio-Frequency Identification), GPS (Global Positioning System), Wi-Fi, Ultra-Wideband (UWB), Bluetooth, or other wireless communication protocols. Alternatively, the tags 148 may include a barcode or other scannable or identifiable marking that is used to check-in or log the location of the device 104.

In one or more embodiments, interface 106 refers to hardware and/or software configured to facilitate communications between a user and the analytics engine 108. Interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 106 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 106 is specified in one or more other languages, such as Java, C, or C++.

Additional embodiments and/or examples relating to computer networks are described below in Section 5, titled "Computer Networks and Cloud Networks."

3. Determining Safe Periods to Transmit Payloads

FIG. 2A illustrates an example set of operations for determining safe periods to transmit payloads in accordance with one or more embodiments. These operations may be viewed as being from the perspective of a server communicating with a device in a network. One or more operations illustrated in FIG. 2A may be modified, rearranged, or omitted all together. Accordingly, the particular sequence of operations illustrated in FIG. 2A should not be construed as limiting the scope of one or more embodiments.

One or more embodiments obtain, from a device in a network, a request for instructions regarding whether the device is permitted to transmit a particular priority dataset (Operation 202). A network may comprise one or more devices that periodically transmit payloads to a server for use by an asset management tool. The devices in the network may require the assistance of an analytics engine to determine when it is safe for the device to transmit the payload, i.e., when the device is not performing a critical function. The device may include a script that sends a request to the analytics engine for instructions whether to transmit a payload or not.

One or more embodiments determine a device type of the device in the network (Operation 204). Upon the analytics engine receiving the request from the device, the analytics engine determines the type of device making the request. The device type may already be known from previous interactions. Alternatively, a profile determination engine may analyze transmissions being sent to and received by the device. With the use of a machine learning model, the profile determination engine may identify a candidate profile for the device. The candidate profile may identify a device type for the device and attributes available to the device.

One or more embodiments identify one or more criteria for determining whether to permit the device to transmit the particular dataset based on the type of the device and attributes of the device (Operation 206). Using the device type and the attributes available to the device, the analytics engine identifies the one or more criteria that, when detected, would indicate that the device is performing a critical function or operation, and that the payload should not be transmitted to the server by the device. The criticality criteria for a device of a particular type may be provided in a mapping or reference table. The analytics engine is then able to retrieve the criticality criteria for the particular device type. Alternatively, the criticality criteria is determined using a machine learning model trained to determine criticality criteria for devices of a particular type.

One or more embodiments obtain the current attributes of the device (Operation 208). The analytics engine may include an attributes determination engine for determining the current attributes of the device. An attributes determination engine analyzes the communications being sent or received by the device to determine the current attributes of the device. The analysis may include determining device ports from which data is being transmitted to or received by the device, a current location of the device, a type of data being transmitted, and/or transmission protocols being used to transmit data.

One or more embodiments determine the criticality of any operations being executed by the device (Operation 210). Once the current attributes of the device are known by the analytics engine, a criticality determination engine of the analytics engine may determine the criticality of any operations being executed by the device. The criticality determination engine uses the criticality criteria identified for the particular device type and determines if any of the current attributes of the device indicate that the device is performing any critical functions.

One or more embodiments determine if the criticality meets one or more criticality criteria (Operation 212). After determining whether an operation being performed is a critical operation, the analytics engine determines if the operation meets one or more criticality criteria for the particular device type. This determination may be performed using a reference chart or by applying a trained machine learning model trained to identify operations that meet criticality criteria.

One or more embodiments determine that the criticality meets one or more criticality criteria and send instructions to the device not to transmit (Operation 214). When the criticality determination engine of the analytics engine determines that the criticality of one or more operations being performed by the device meet criticality criteria, the analytics engine sends instructions to the device not to transmit. Alternatively, the analytics engine refrains from sending any instructions, which has the same effect as if instructions not to transmit were sent.

One or more embodiments determine that the criticality does not meet one or more criticality criteria and sends instructions to transmit (Operation 216). When the analytics engine determines that the criticality of the operations currently being executed by the device do not meet any criticality criteria, the analytics engine sends instructions to the device to transmit the payload.

FIG. 2B illustrates an example set of operations for determining safe periods to transmit payload in accordance with one or more embodiments. These operations may be viewed as being from the perspective of a device in a network communicating with a server. One or more operations illustrated in FIG. 2B may be modified, rearranged, or omitted all together. Accordingly, the particular sequence of operations illustrated in FIG. 2B should not be construed as limiting the scope of one or more embodiments.

One or more embodiments receive profile information from an analytics engine (Operation 218). Devices in a network generally are not aware of their type or attributes. A device merely perform the operations that it is configured to perform. An analytics engine provides the device with profile information that may include the device type, ports considered critical, service names considered critical, and other attributes that are available for use by the device.

One or more embodiments check the profile information for critical service names and critical ports (Operation 220). Prior to determining whether to transmit a payload, the device checks the profile information provided by the analytics engine to identify the critical service names and critical ports for the device.

One or more embodiments check the current network activity for the critical service names and network activity on the critical ports (Operation 222). The device checks the current network activity of the device to determine the names of the services being used by the device and the ports of the device on which those services are being used.

One or more embodiments determine if there is network activity on the critical ports or from the critical processes (Operation 224). The device compares the detected network activity currently being executed by the device with the critical service names identified in the profile information provided by the analytics engine and the detected active ports with critical ports identified in the profile information provided by the analytics engine. When the device determines that there is no network activity on any of the critical ports and that there are no critical processes being performed, a transmission module of the device transmits a dataset, e.g., payload, to the analytics engine.

One or more embodiments, in response to determining that there is network activity on critical ports and/or including critical processes, send a request to the analytics engine for permission to transmit (Operation 226). When the device determines that any network activity currently being executed by the device is on a critical port or includes a critical process, the device sends a request to the analytics engine for permission to transmit.

One or more embodiments receive instruction from the analytics engine to transmit (Operation 228). Initially, the device may receive instruction from the analytics engine not to transmit. Alternatively, the analytics engine refrains from sending any instruction to the device, thereby preventing the device from transmitting. In response to receiving the request from the device for permission to transmit, the analytics engine performs the operations detailed in FIG. 2A to determine if it is safe for the device to transmit the payload. When the analytics engine determines that the current attributes of the device fail to meet any criticality criteria, the analytics engine sends instructions to the device to transmit.

One or more embodiments transmit the payload to the analytics engine (Operation 230). Upon receipt of the instructions from the analytics engine, the device transmits the payload to the server.

4. Criticality Based on Location

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
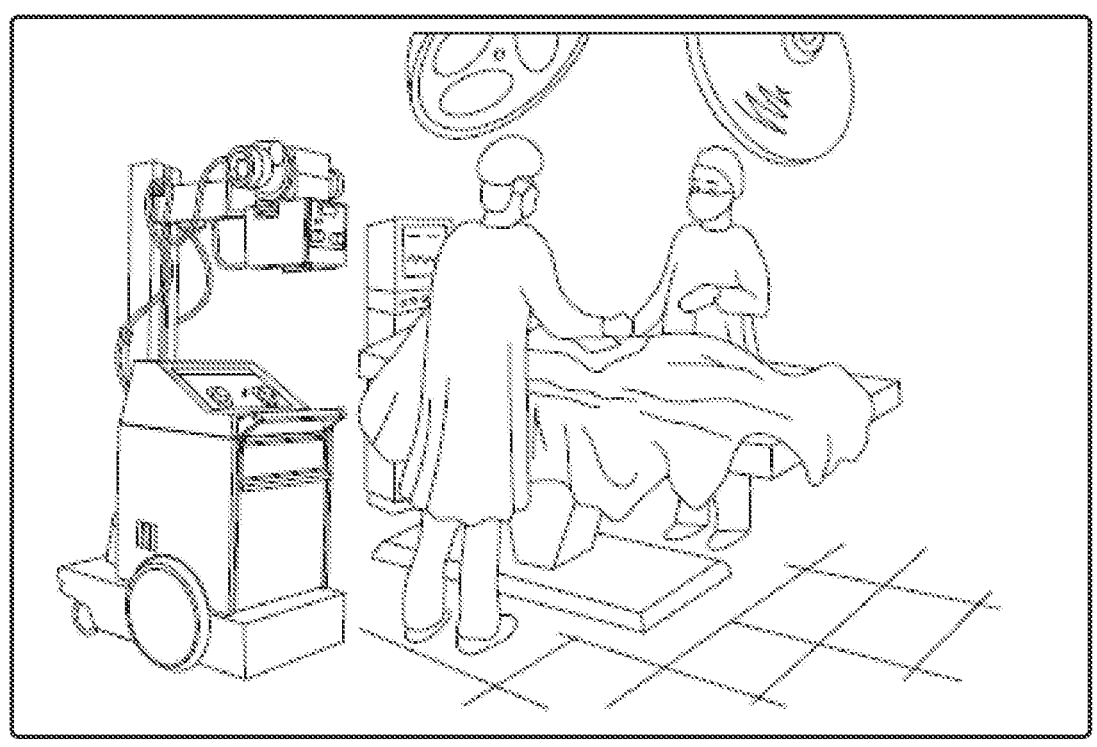
FIG. 3A illustrates a medical device in a critical location, e.g., operating room.

FIG. 3A illustrates a medical device in a critical location. More particularly, the medical device is an x-ray machine, and the critical location is in an operating room. Any operation of the x-ray machine within the operating room may cause the criticality determination engine to determine that the operations being performed by the device are critical, and that it is not safe to transmit the payload. In some embodiments, the criticality determination engine may analyze the transmission protocol being used by the x-ray machine, the data being transmitted by the x-ray machine, the ports being used by the x-ray machine to transmit the data, or any combination of these to determine whether the operations being performed by the x-ray machine meet criticality criteria. Although the device may be in a location designated as being critical, the operations being performed by the device may not rise to the level of criticality to warrant not transmitting a payload.

Figure 3B:
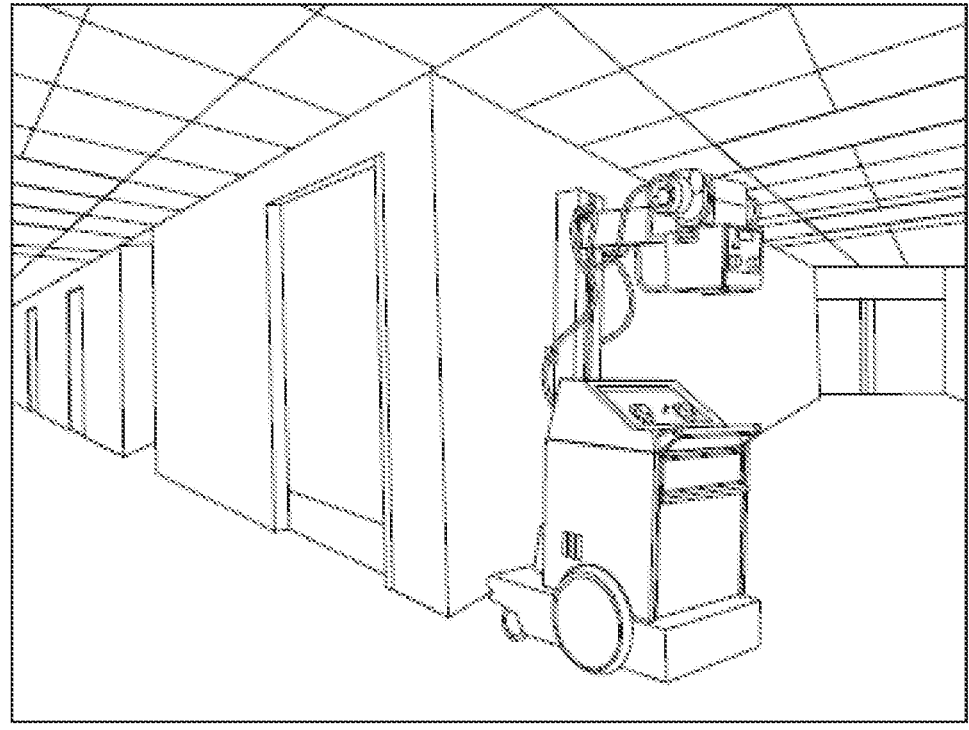
FIG. 3B illustrates the medical device of FIG. 3A in a non-critical location, e.g., hallway.

FIG. 3B illustrates the medical device of FIG. 3A in a non-critical location. More particularly, the x-ray machine of FIG. 3A is illustrated as being in a hallway. The x-ray machine may be using a port or transmission protocol designated as critical, or it may be transmitting data that would otherwise be considered critical. However, the location of the device in a non-critical location, e.g., hallway, may indicate that the criticality of these characteristics is low, and that it is safe to transmit the payload. Although the device may be in a location designated as being non-critical, the operations being performed by the device may exceed a level of criticality to warrant refraining from transmitting a payload.

5. Computer Networks and Cloud Network

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally, or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
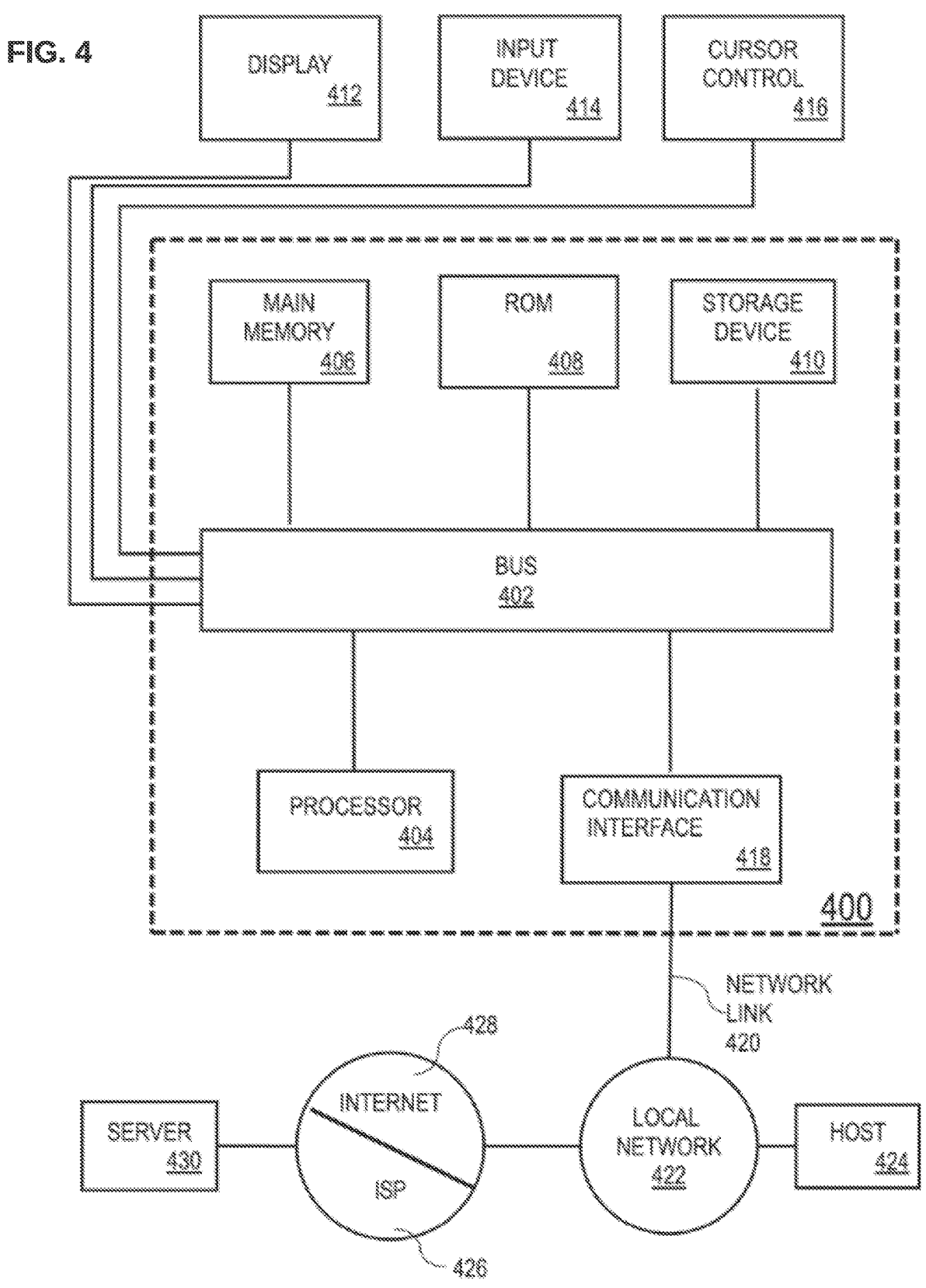
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

obtaining, at a first time, a first set of current attributes corresponding to a device;

training a machine learning model using training datasets to predict criticality levels for operations being executed by the device, each training dataset comprising a particular set of current attributes and a corresponding criticality level;

based on the first set of current attributes, determining that the device is currently executing an operation that meets one or more criticality criteria, wherein determining that the device is currently executing the operation that meets one or more criticality criteria comprises:

applying the machine learning model to first set of current attributes to determine a criticality level of the operation being executed by the device; and comparing the criticality level to the one or more criticality criteria; and responsive to determining that the device is currently executing the operation that meets the one or more criticality criteria, causing the device to refrain from transmitting a particular dataset generated by the device.

2. The one or more non-transitory computer readable media of claim 1, wherein determining that the device is currently executing the operation that meets one or more criticality criteria comprises:

detecting data being transmitted by or to the device on a device port; and determining that the device port is mapped to a criticality category that meets one or more criticality criteria.

3. The one or more non-transitory computer readable media of claim 1, wherein determining that the device is currently executing the operation that meets one or more criticality criteria comprises:

detecting a current location of the device; and determining that the current location is mapped to a criticality category that meets one or more criticality criteria.

4. The one or more non-transitory computer readable media of claim 1, wherein determining that the device is currently executing the operation that meets one or more criticality criteria comprises:

detecting data transmitted to or from the device; and analyzing the data to determine that the data is mapped to a criticality category that meets one or more criticality criteria.

5. The one or more non-transitory computer readable media of claim 1, wherein determining that the device is currently executing the operation that meets one or more criticality criteria comprises:

detecting a transmission protocol corresponding to data transmitted to or from the device; and analyzing the transmission protocol to determine that the transmission protocol is mapped to a criticality category that meets one or more criticality criteria.

6. The one or more non-transitory computer readable media of claim 1, wherein the operations further comprise:

determining the one or more criticality criteria based on a device type corresponding to the device.

7. The one or more non-transitory computer readable media of claim 6, wherein the operations further comprise:

determining the device type, wherein determining the device type comprises:

training a second machine learning model using training datasets to predict device types, each training dataset comprising a particular set of device attributes and a corresponding particular device type;

applying the second machine learning model to one or more attributes of the device to determine the device type;

receiving feedback on the device type determined for the device; and retraining the second machine learning model based on the feedback.

8. The one or more non-transitory computer readable media of claim 1, wherein the operations further comprise:

obtaining, at a second time, a second set of current attributes corresponding to the device;

based on the second set of current attributes, determining that the device is not currently executing any operation that meets the one or more criticality criteria; and responsive to determining that the device is not currently executing any operation that meets the one or more criticality criteria, causing the device to transmit the particular dataset generated by the device.

9. The one or more non-transitory computer readable media of claim 1, wherein the operations further comprise:

prior to obtaining the first set of current attributes, obtaining, from the device, a request for instructions regarding whether the device is permitted to transmit the particular dataset.

10. A method comprising:

obtaining, at a first time, a first set of current attributes corresponding to a device;

training a machine learning model using training datasets to predict criticality levels for operations being executed by the device, each training dataset comprising a particular set of current attributes and a corresponding criticality level;

based on the first set of current attributes, determining that the device is currently executing an operation that meets one or more criticality criteria, wherein determining that the device is currently executing the operation that meets one or more criticality criteria comprises:

applying the machine learning model to first set of current attributes to determine a criticality level of the operation being executed by the device; and comparing the criticality level to the one or more criticality criteria; and responsive to determining that the device is currently executing the operation that meets the one or more criticality criteria, causing the device to refrain from transmitting a particular dataset generated by the device, wherein the method is performed by at least one device including a hardware processor.

11. A system comprising:

at least one device including a hardware processor; and the system being configured to perform operations comprising:

obtaining, at a first time, a first set of current attributes corresponding to a device;

training a machine learning model using training datasets to predict criticality levels for operations being executed by the device, each training dataset comprising a particular set of current attributes and a corresponding criticality level;

based on the first set of current attributes, determining that the device is currently executing an operation for a patient that meets one or more criticality criteria, wherein determining that the device is currently executing the operation that meets one or more criticality criteria comprises:

applying the machine learning model to first set of current attributes to determine a criticality level of the operation being executed by the device, and comparing the criticality level to the one or more criticality criteria; and responsive to determining that the device is currently executing the operation that meets the one or more criticality criteria, causing the device to refrain from transmitting a particular dataset generated by the device.

12. The method of claim 10, wherein determining that the device is currently executing the operation that meets one or more criticality criteria comprises:

detecting data being transmitted by or to the device on a device port; and determining that the device port is mapped to a criticality category that meets one or more criticality criteria.

13. The method of claim 10, wherein determining that the device is currently executing the operation that meets one or more criticality criteria comprises:

detecting a current location of the device; and determining that the current location is mapped to a criticality category that meets one or more criticality criteria.

14. The method of claim 10, wherein determining that the device is currently executing the operation that meets one or more criticality criteria comprises:

detecting data transmitted to or from the device; and analyzing the data to determine that the data is mapped to a criticality category that meets one or more criticality criteria.

15. The method of claim 10, wherein determining that the device is currently executing the operation that meets one or more criticality criteria comprises:

detecting a transmission protocol corresponding to data transmitted to or from the device; and analyzing the transmission protocol to determine that the transmission protocol is mapped to a criticality category that meets one or more criticality criteria.

16. The method of claim 10, further comprising:

determining the one or more criticality criteria based on a device type corresponding to the device.

17. The method of claim 16, further comprising:

determining the device type, wherein determining the device type comprises:

training a second machine learning model using training datasets to predict device types, each training dataset comprising a particular set of device attributes and a corresponding particular device type;

applying the second machine learning model to one or more attributes of the device to determine the device type;

receiving feedback on the device type determined for the device; and retraining the second machine learning model based on the feedback.

18. The method of claim 10, further comprising:

obtaining, at a second time, a second set of current attributes corresponding to the device;

based on the second set of current attributes, determining that the device is not currently executing any operation that meets the one or more criticality criteria; and responsive to determining that the device is not currently executing any operation that meets the one or more criticality criteria, causing the device to transmit the particular dataset generated by the device.

19. The method of claim 10, further comprising:

prior to obtaining the first set of current attributes, obtaining, from the device, a request for instructions regarding whether the device is permitted to transmit the particular dataset.

* * * * *